Nov. 26, 1968     D. E. POWELL ETAL     3,412,600
CONTROLLING AND MEASURING THE TENSION IN THE BAND
ON IMPLOSION RESISTANT CATHODE RAY TUBES
Filed Nov. 3, 1965

INVENTOR.
DARYL E. POWELL
BURTON W. SPEAR

E. J. Holler
W. A. Schaich
ATTORNEYS

United States Patent Office 3,412,600
Patented Nov. 26, 1968

3,412,600
CONTROLLING AND MEASURING THE TENSION IN THE BAND ON IMPLOSION RESISTANT CATHODE RAY TUBES
Daryl E. Powell, Maumee, and Burton W. Spear, Toledo, Ohio, assignors to Owens-Illinois, Inc., a corporation of Ohio
Filed Nov. 3, 1965, Ser. No. 506,169
9 Claims. (Cl. 73—88)

ABSTRACT OF THE DISCLOSURE

A cathode ray tube faceplate rendered implosion resistant by means of a tensionally stressed reinforcing band encompassing the periphery of the faceplate and having a dimentionally reduced region exhibiting characteristics of dimensional change in response to and accurately correlated with the extent of tensional stress in the reinforcing band, and providing in consequence thereof a means both for accurately determining the extent of tensional stress existing in the reinforcing band and for accurately controlling the extent of tensional stress in the reinforcing band.

---

This invention relates to cathode ray tubes and particularly to glass cathode ray tubes having an implosion band for imparting implosion resistant properties to the cathode ray tube.

In order to make glass cathode ray tubes more implosion resistant, it has been suggested that an endless reinforcing band be applied under tension around the flange of the face plate. For example, such bands are shown in the patent to Vincent et al. 2,785,820.

One of the problems in connection with the use of such bands is the measurement of tension in order to insure that the bands are at the proper tension. Existing methods of measuring band tension have required the use of devices to be positioned under the band where a clearance is available between the band and the tube. In the use of the such devices, the band is displaced and the tension is measured. If there is insufficient clearance between the band and the tube, a destructive method of testing must be used by cutting the band. With the advent of tighter fitting tension bands such as one-piece sweated bands or spot welded bands requiring no connecting clip, there have been no methods available for controlling or measuring the band tension without destroying the band.

It is an object of this invention to provide a cathode ray tube and band construction wherein the band tension can be accurately controlled.

It is a further object of the invention to provide a cathode ray tube having a band construction wherein the tension can be readily measured.

It is a further object of the invention to provide a method of measuring the tension in the band of an implosion resistant cathode ray tube.

Figure 1:
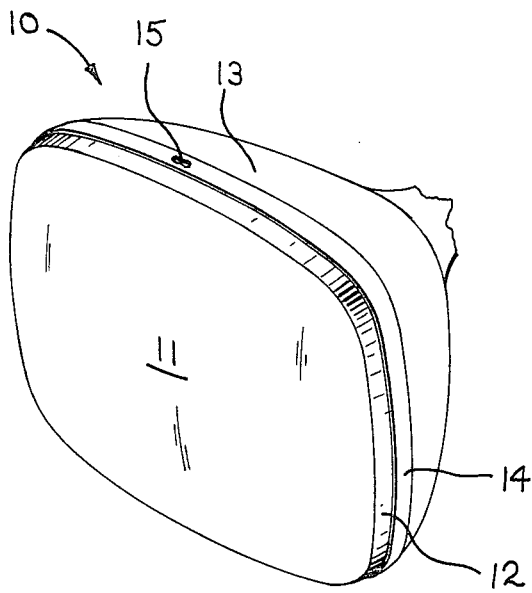
Figure 2:
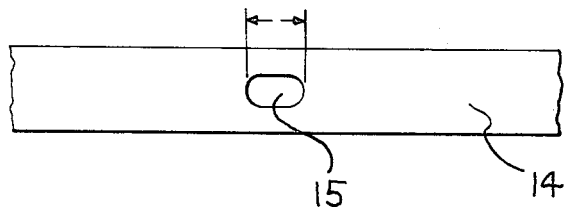
Figure 3:
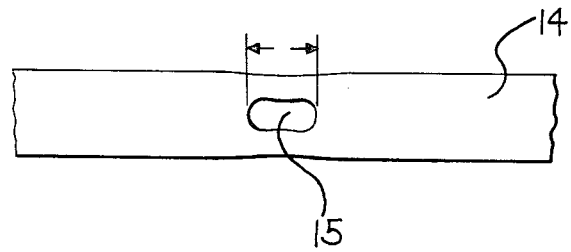

In the drawings:
FIG. 1 is a fragmentary perspective view of a cathode ray tube embodying the invention.
FIG. 2 is a fragmentary view of a band prior to being applied to the tube.
FIG. 3 is a fragmentary view similar to FIG. 2 showing the band after it is applied to the cathode ray tube.

Basically, the invention comprises providing an area of reduced cross section in the band which is controlled in dimension such that when the band is applied to the cathode ray tube, the area of reduced cross section is stressed beyond the yield point of the band material. As a result, the tension on the band is controlled and is at the yield point tension.

Referring to FIG. 1, the cathode ray tube 10, comprising a face plate 11 having a flange 12, is connected to the funnel 13 in a conventional manner. The band 14, which is applied to the cathode ray tube, comprises an endless band that is sweated into position or a spot welded band that is placed in position and then welded while tension is being applied to the band. Alternatively, the band may comprise a length of material which is applied to the tube by a clinching mechanism utilizing a clip.

In accordance with the invention, an elongated opening 15 is applied in the band at a point along the length thereof to reduce the cross section of the band. The opening is precisely dimensioned such that the cross section of the band is reduced. When tension is applied to the band, the reduced cross section insures that the band will be stretched to the yield point of the material so that tension in the band will not exceed a predetermined amount and will thereby be controlled.

As shown more specifically in FIG. 3, when a hole or slot of known length L is punched through the band and the band is applied to the tube and thereafter tensioned, the slot length will begin to gradually increase due to the yielding material at the minimum cross section of the band adjacent the slot. As continued tension is applied, a level will be reached where the tension cannot be significantly increased, namely, at the yield point of the metal at the slot, and any further attempt to significantly increase the tension will only result in further increasing the slot length with only a minor increase in tension. Simultaneously, the cross section of the band will be reduced.

It has been found, for example, that in the use of a band having a slot length of 7/16 of an inch, where the band has a dimension of 5/8 inch by .023 inch and is made of semi-tempered steel, the following tension forces produce the following elongations—

| Pounds: | Elongation in inches |
|---|---|
| 200 | 0.000 |
| 400 | 0.001 |
| 600 | 0.010 |
| 800 | 0.023 |
| 850 | 0.030 |
| 850 | 0.035 |

It can be seen that the increase in elongation at 850 pounds indicates that the band has reached the yield tension.

In addition to providing a means for controlling the tension in the band, the provision of a reduced cross section permits the tension to be readily determined by measuring the change in elongation either through the use of accurate calipers or an optical comparator.

It can be seen that the accurate measurement of the tension can be made without destroying the band and can be achieved quickly.

We claim:
1. A cathode ray tube comprising
a face plate and a funnel extending from the face plate,
an endless reinforcing band surrounding the face plate,
said band having a localized area of reduced cross section,
said band being under tension such that the area of reduced cross section is stressed beyond the yield point of the band material.

2. A cathode ray tube comprising
a face plate and a funnel extending from the face plate,
an endless reinforcing band surrounding the face plate,
said band having a transverse opening therethrough,
said band being under tension such that the portion of the band containing the opening is stressed beyond the yield point of the band material.

3. A cathode ray tube comprising
a face plate and a funnel extending from the face plate, an endless reinforcing band surrounding the face plate,
said band having an opening therethrough which is elongated in a direction longitudinally of the band,
said band being under tension such that the portion of the band containing the opening is stressed beyond the yield point of the band material.

4. A cathode ray tube comprising
a face plate and a funnel extending from the face plate,
an endless reinforcing band surrounding the face plate and being under tension,
said band including an apertured area of reduced cross section,
said apertured area exhibiting characteristics of dimensional change in response to and in accurately correlated relationship with the extent of tensional stress in said reinforcing band.

5. A cathode ray tube comprising
a face plate and a funnel extending from the face plate,
an endless reinforcing band of substantially constant width and thickness surrounding the face plate,
said band having an opening therethrough and being elongated under permanent tension
the extent of the elongation of said opening corresponding to and being accurately correlated with the extent of tensional stress in said reinforcing band.

6. The method of measuring the tension of an endless reinforcing band applied to the area surrounding the face plate of a cathode ray tube which comprises
forming a portion of reduced cross section on the band,
applying the band to the tube so that the band is under tension,
causing said area of reduced cross section to change in cross section in proportion to the tension on the band,
and measuring the change in area of the reduced cross section.

7. The method of measuring the tension in an endless reinforcing band applied to the area surrounding the face plate of a cathode ray tube which comprises
forming an opening in the band,
applying the band to the tube so that the band is under tension,
causing said opening to elongate in proportion to the tension on the band,
and measuring the change in area of the opening.

8. The method of measuring the tension in an endless reinforcing band applied to the area surrounding the face plate of a cathode ray tube which comprises
forming a portion of reduced cross section on the band,
applying the band to the tube so that the band is under tension and the area of reduced cross section reaches the yield point of the band material,
causing said area of reduced cross section to change in cross section in proportion to the tension on the band,
and measuring the change in area of the reduced cross section.

9. The method of measuring the tension in an endless reinforcing band applied to the area surrounding the face plate of a cathode ray tube which comprises
forming an opening in the band,
applying the band to the tube so that the band is under tension and the portion of the band containing the opening reaches the yield point of the band material,
causing said portion of the band containing the opening to change in cross section in proportion to the tension on the band,
and measuring the elongation of the opening.

References Cited

UNITED STATES PATENTS

| 3,332,569 | 7/1967 | Spear | 220—2.1 |
| 3,136,154 | 6/1964 | Christensen | 73—88 |
| 3,246,701 | 4/1966 | Schulz. | |

FOREIGN PATENTS

| 1,301,923 | 7/1962 | France. |
| 897,116 | 5/1962 | Great Britain. |
| 966,206 | 8/1964 | Great Britain. |

RICHARD C. QUEISSER, *Primary Examiner.*

JAMES H. WILLIAMSON, *Assistant Examiner.*